Feb. 24, 1931. H. JOHNSON 1,794,077
AIR TRAIN LINE COUPLING
Filed Feb. 1, 1928 2 Sheets-Sheet 2

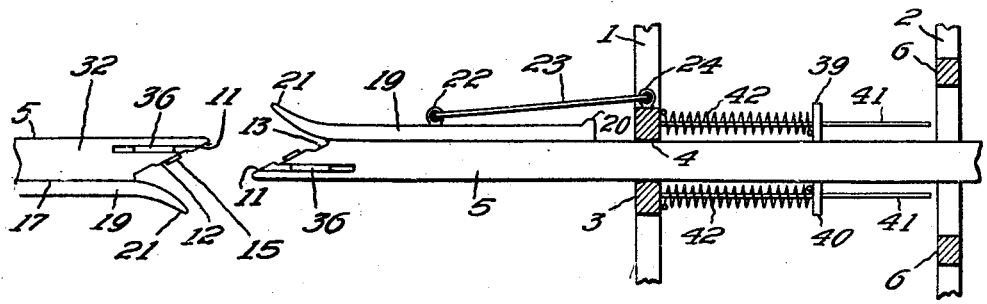

INVENTOR:
H. Johnson
BY
H. J. Sanders
ATTORNEY.

Patented Feb. 24, 1931

1,794,077

UNITED STATES PATENT OFFICE

HENNING JOHNSON, OF CHICAGO, ILLINOIS

AIR TRAIN-LINE COUPLING

Application filed February 1, 1928. Serial No. 251,095.

This invention relates to improvements in air train line couplings and its chief object is to provide means for automatically coupling the air hose and supplying air through the entire train line when the train is coupled up and the engine is pumping air, and for uncoupling the air hose when the train is uncoupled at one or more points, the air hose being uncoupled at all points where the train is uncoupled and loss of air prevented from the entire train line at all points.

A further object is to provide a coupling that will protect the ends of the air hose from damage or tampering, these ends being normally exposed and dangling from the ends of uncoupled cars at present.

A still further object is to provide an air train line coupling that is simple in construction, positive and efficient in operation, cheap to manufacture and durable in use.

With the foregoing and other objects in view the invention consists in the combination and arrangement of parts to be hereinafter fully described, pointed out in the claims and illustrated in the accompanying drawings which form a part of this application for patent and in which—

Fig. 1 is a plan view of two cooperating coupling members, partly in section.

Fig. 2 is a similar view with the said members coupled.

Fig. 3 is a sectional view, enlarged, of one end of one of the coupling members showing how the air hose is received therein.

Like reference characters denote corresponding parts throughout the several views.

Figure 4:
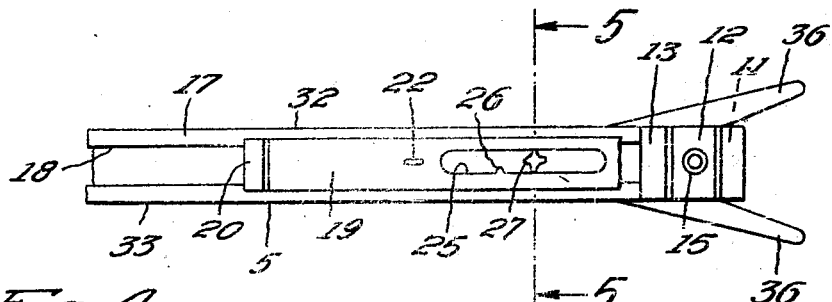
Fig. 4 is a view of a coupling member in side elevation.
Figure 5:
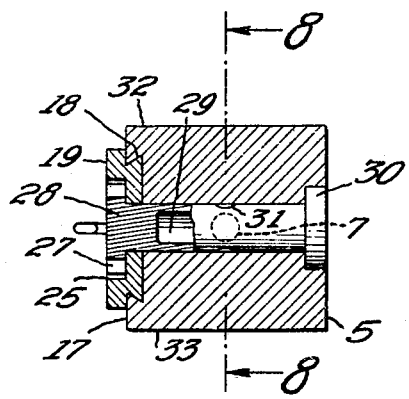
Fig. 5 is a cross section, enlarged, on line 5—5 of Fig. 4.
Figure 6:
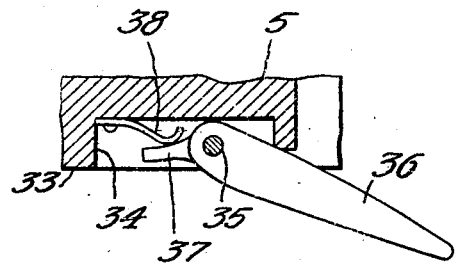
Fig. 6 is a fragmentary sectional view of a coupling member illustrating a guide arm employed.
Figure 7:
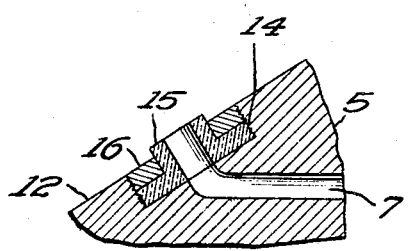
Fig. 7 is a fragmentary sectional view of the outer end of one coupling member.
Figure 8:
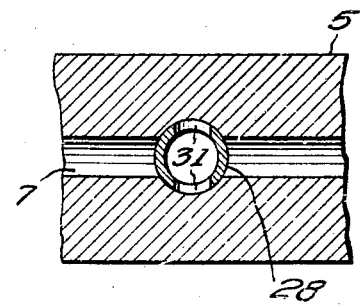
Fig. 8 is a cross section through Fig. 5 on the line 8—8.

The device comprises essentially a pair of buffer bars carried by each car or vehicle, the bars being carried by brackets attached to the vehicle, each buffer at one end receiving the air line hose, the opposite end of the buffer being shaped for contact and engagement with the corresponding end of a like buffer bar carried by another vehicle. Each buffer bar is provided with air control mechanism that, when two buffer bars come together and couple, automatically releases the air or opens the air passageways in both buffer bars to permit unrestricted passage of air from one to the other bar, said control mechanism operating to instantly close said air passageways when the buffer bars are separated or uncoupled.

As the buffer bars are identical in construction, two being carried by each vehicle a description of one together with its moorings will be sufficient. The reference numeral 1 denotes a bracket secured to and depending from one end of the car or vehicle and 2 a second bracket similarly supported and spaced from the bracket 1 and located more inwardly from the vehicle end. The bracket 1 is formed with a transversely extending guide yoke 3 having a perforation 4 therein to receive the buffer bar 5 while the second bracket 2 is formed with widely spaced yoke bars 6, 6 between which the buffer bar 5 extends, a considerable space or clearance being provided between each yoke bar 6 and said buffer bar.

The yoke bar is formed with a central longitudinally extending air passageway 7 and at its inner end with a slightly enlarged threaded cavity or socket 8 to receive the inner threaded end of the nipple 9 carried at one end of the train line hose 10. The buffer bar is square in cross section and its outer end is recessed so that the face formed at its outer termination is disposed substantially at an angle of 45 degrees to its axis, this face, however, being stepped or waved so that the face portions 11, 12, 13 are formed.

The face portion 12 is formed with the recessed threaded portion 14 that forms a seat for the rubber mouth piece 15, the central perforation in which registers with the air passageway 7, said mouth piece being retained in position by the nut 16 threaded peripherally to permit it to be screwed into the threaded recess 14 in the face portion 12, a surface groove being provided in the said nut to permit its movement by a screw driver.

One face 17 of the buffer bar is formed with a recess or mortise 18 in which a guide arm 19 is slidably arranged, said guide arm terminating at one end in a heel 20 and at the other in an outwardly curved portion 21. A ring 22 affixed to said arm 19 is connected by the flexible rod or cable 23 to another ring 24 affixed to the yoke 3. The said arm 19 is formed, further, with the elongated slot 25 into which the tooth 26 projects that is adapted for operative engagement with one of the four teeth of the pinion 27 formed upon the rotary valve 28 formed with the longitudinal bore 29 and extending transversely through the buffer bar, the head 30 being of greater diameter than the body portion of the valve and countersunk in the said buffer bar, said valve extending through the air passageway 7 of the buffer bar and being formed with two diametrically opposed perforations 31 adapted, as the valve is rotated, to move into and out of registration with the said air passageway to open or close the same.

The faces 32 and 33 of the buffer bar are diametrically opposed faces and are what may be termed top and bottom faces and each one is formed with a recess 34, the recesses 34 of said faces being formed at the outer end of the buffer bar and adjacent different lateral faces of the bar, that is the recess 34 of the face 32 lies in a vertical plane that is parallel to but spaced from the vertical plane of the recess 34 of face 33.

A pin 35 is arranged in each recess 34 and fast upon each pin 35 is an arm 36 that extends obliquely outward and away from the bar, each arm 36 being formed with an integral heel 37 engaged frictionally by a spring 38 also secured in the recess 34, said spring 38 serving yieldingly to retain an arm 36 in a predetermined position, the free ends of said arms 36 normally extending outwardly in a common general direction but diverging from each other.

Each buffer bar has fast to opposite lateral faces the stop pins 39, 40 disposed between the brackets 1, 2, a rod 41 secured to the yoke 3 extending through each stop pin and beyond same, and an expansion coil spring 42 encircling each rod is secured to one pin 39 or 40 and to the yoke 3. In Fig. 1 the buffer bars of the two uncoupled vehicles are shown ready to be connected or coupled. As the vehicles move together the guide arms 19 and the pivoted arms 36 will serve to guide the free ends of the buffer bars together. Each arm 19 will frictionally engage with the adjacent buffer bar and as said bars meet they will assume the position shown in Fig. 2, any relative movement of a buffer bar to yoke 3 being yieldingly resisted by the springs 42 while contact of each arm 19 with a yoke 3 will arrest movement of said arm, in one direction, with the buffer bar. There will always be sufficient movement of a buffer bar relative to its arm 19 to cause the tooth 26 to engage with the pinion 27 and move the same one quarter revolution as the cars are coupled thus causing the valve openings 31 to register with and open the air passageway 7. As long as the vehicles are coupled together the buffer bars will be retained in engagement with each other by the several springs 42, two of which are provided for each buffer bar. The free ends of the buffer bars meeting and being firmly pressed together and held in alignment by the arms 19 and pivoted arms 36 the mouth pieces 15 will register with each other, these members being made for close fitting air-tight engagement with each other, so that the joined air passageways will, in effect, form a continuous passageway.

When the cars are uncoupled the separation of the buffer bars will naturally be effected and the outward movement of each buffer bar with relation to its sliding guide arm 19 will cause one more quarter revolution of the pinion 27 thus closing the valve openings 31 again in the air passageway.

What is claimed is:—

1. In an air train line coupling, a buffer bar formed with an air passageway and receiving an air hose, a support for said buffer bar, a connection between said buffer bar and support for yieldingly retaining said members in a predetermined relative position, guide arms carried by said buffer bar, one of said guide arms being slidably connected to said bar, a rotary valve for opening and closing the air passageway in said buffer bar, actuating means for said valve connecting the same and said sliding guide arm, and a connection between said sliding guide arm and said support.

2. In an air train line coupling, a buffer bar formed with an air passageway and receiving an air hose, a support bracket, a yoke carried thereby slidably supporting said buffer bar, means adjustably connecting said buffer bar and yoke for yieldingly retaining them in a predetermined relative position, guide arms carried by said suffer bar, one of said guide arms being slidably supported on the bar, a rotary valve extending through said buffer bar for opening and closing the air passageway therein, valve actuating means connecting the valve and said sliding guide arm, and a flexible connection between said sliding guide arm and said support.

In testimony that I claim the foregoing as my own I have hereto affixed my signature.

Chicago, Illinois, January 28, 1928.

HENNING JOHNSON.